Nov. 12, 1935.  G. O. ROBERT  2,020,905
COMPENSATED COMPASS, ESPECIALLY FOR AERIAL VEHICLES
Filed Jan. 10, 1934  3 Sheets-Sheet 1
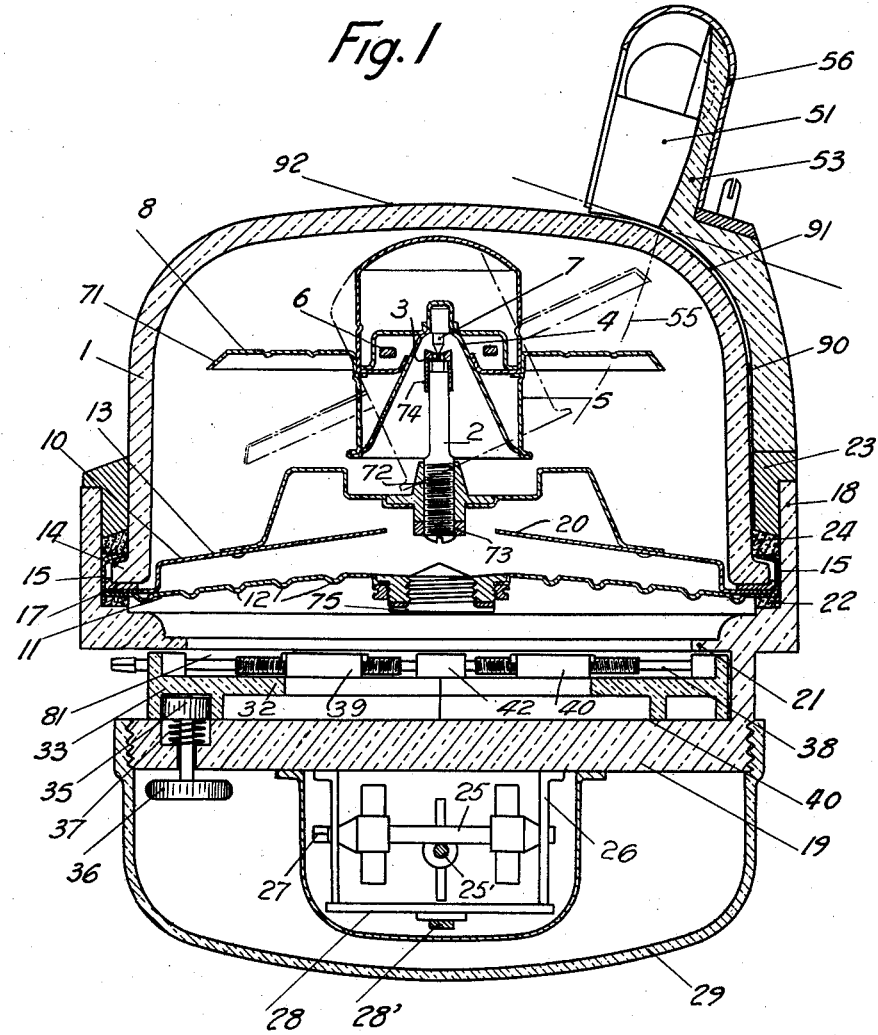
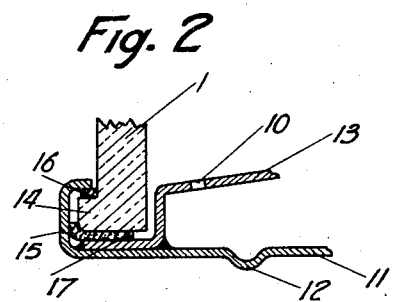
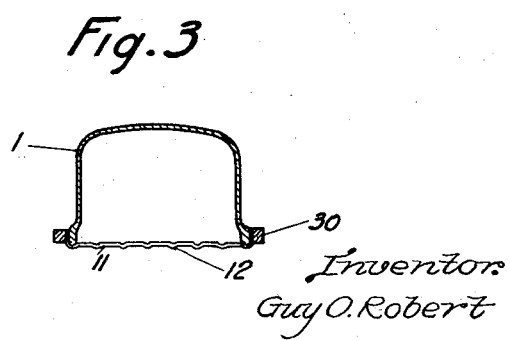
Inventor:
Guy O. Robert
By: Marks & Clark
Attys Nov. 12, 1935.   G. O. ROBERT   2,020,905
COMPENSATED COMPASS, ESPECIALLY FOR AERIAL VEHICLES
Filed Jan. 10, 1934   3 Sheets-Sheet 2

Inventor
Guy O. Robert
By: Marks & Clark
Attys.

Nov. 12, 1935.  G. O. ROBERT  2,020,905
COMPENSATED COMPASS, ESPECIALLY FOR AERIAL VEHICLES
Filed Jan. 10, 1934  3 Sheets-Sheet 3

Inventor
Guy O. Robert
By Marks & Clark
Attys.

Patented Nov. 12, 1935

2,020,905

UNITED STATES PATENT OFFICE 2,020,905

COMPENSATED COMPASS, ESPECIALLY FOR AERIAL VEHICLES

Guy Octave Robert, Paris, France

Application January 10, 1934, Serial No. 706,113
In France January 12, 1933

12 Claims. (Cl. 33—223)

The present invention has for its object a compass designed more particularly for airplanes or small boats and presenting the following features.

A compass float supporting the magnets and the rhumb is movable in a transparent bell filled with a liquid as, alcohol, uncongealable over the range of temperatures at which it is to be used, and damping the oscillations and trepidations; said glass or crystal bell is wide enough to allow the rhumb to remain substantially horizontal during the angular movements of the aeroplane, to be easily seen by the pilot.

The whole constituted by the float and the rhumb is shaped as a perfectly regular surface of revolution, in order to reduce the friction with the liquid. The bell and the different pieces disposed inside are also shaped as surfaces of revolution round the compass axis, in order to avoid disturbances by the liquid, during a turn of the aeroplane. The lubber line of the aeroplane is constituted by the virtual image of an illuminated line disposed outside the bell. As the liquid filling the bell expands and contracts because of the great variations of temperature, when the aeroplane rises to high altitudes, the bell is provided with an elastic cap bottom able to absorb the variations in volume of the bell and liquid. In order to avoid the inimical effects of the vibrations, which in an ordinary compass could produce deflections, the rhumb support is so disposed that its center of gravity is on the axis of the compass and more exactly on the center pin support. The magnets disposed inside the float are curved, thus allowing like poles to be brought nearer to each other in order to obtain a more accurate compensation. To conserve space the quadrantal compensation is obtained by means of two sets of soft iron bars disposed on a plate able to rotate round the compass axis; these sets are able to be moved toward and away from said axis; this device can be removed if the quadrantal deviations are small or supplemented by an extra set of soft iron bars mounted on the plate if they are great. The longitudinal and transverse component of the semi-circular deviations are each compensated by a device comprising two parallel magnets bars, mounted in opposite directions on a spindle perpendicular thereon, so that the rotation of the same brings the two different poles nearer or farther from a steady soft iron bar. The two compensating devices are disposed at right angle from one another.

The following disclosure and the annexed figures show by way of example a form of execution of the apparatus. Particular modifications, being a part of the invention are explained in the course of the disclosure.

Fig. 1 is a partial cross section of the whole of the compass.

Figs. 2 and 3 show the manner in which the bell is rendered air-tight.

Figure 4:
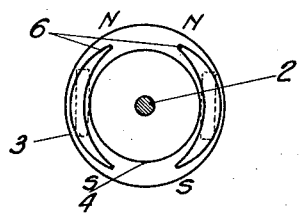
Fig. 4 shows how the magnets can be disposed in the float.

The moving part of the compass is enclosed in a glass bell 1 filled with a damping liquid. The rhumb carrier, supported by a spindle 2 ending in a step-bearing 3, is shaped like a bell with double walls, between said walls 4 and 5 are disposed the magnets 6; said carrier constitutes thus a float supported by step bearing 3 by intermediary of pin 7. On its external wall is mounted rhumb 8.

The bell is made sufficiently large so that the rhumb carrier may oscillate round its point of suspension through a substantial angle without said rhumb coming in contact with the bell.

The external surface of the bell is constituted by three parts of surfaces of revolution joining with one another, at first a part 90 in form of a cylinder or of a frusto-cone the apex angle of which is very small, further a tore shaped part 91, and then a part 92 constituted by a segment of a sphere having a very great radius, the tore shaped surface 92 joining the two other parts to one another. The thickness of the bell is constant for parts 90 and 91, but on the spheric segment 92 it decreases slightly in order to produce, as a lens, an optical magnifying effect.

Bell 1 is closed by a diaphragm 11, elastic enough to absorb the variations of volume of the liquid and of the bell when the temperature varies.

The compensating devices to be disclosed are placed below the bell.

In addition to the diaphragm or corrugated bottom 11, the bell is provided with a second bottom 13 which is dome shaped in its central part, supports spindle 2 and is also used for removing the air bubbles as hereinafter explained.

Fig. 2 shows at an enlarged scale a form of execution of the joint between the bell and the two cap bottoms thereof.

Bell 1 is provided with a circular projection 14 and bottom 11 with a rim 15 which is shrunk in order to bear on projection 14 by intermediary of a washer 16 in any elastic material, cork, rubber or the like, the second bottom 13 is held between the rim of the bell and bottom 11 by intermediary of another plastic washer 17. Both bottoms are soldered to one another at their periphery.

In the presently used compasses, rigid metallic parts are in contact with a glass cover by intermediary of a joining material. Owing to variations of temperature, the glass and metal take different expansions, resulting in leakage, due to the fact that the rigid metallic parts do not follow the expansions of the glass. In the above disclosed device, said differences in the expansions are absorbed by the elastic joints, but a modification of said device, illustrated in Fig. 3 may also be employed.

The stamped elastic cap bottom 11 as shown in Fig. 3, projects upwards at its periphery and forms a rim which surrounds the lower part of bell 1; it is applied against it by a washer 30 either in glass or in a metal having the same coefficient of expansion as the glass (say nickel steel with 46% of nickel, or platinum) said washer is heated, placed like a hood and thus presses strongly the upwards projecting rim of the corrugated cap bottom against the bell. The washer and bell having the same coefficient of expansion the pressure remains the same whatever the temperature.

The second bottom is provided with one or a plurality of holes 19 on its side towards the fore end of the aeroplane. Thus, by suitably tilting the closed bell, it is possible to pass through said holes any air bubbles which may have been formed inside the liquid. Said bubbles, when the bell is returned to its normal position, go upwards in the dome forming the central part of the second bottom where they are unable to produce any disturbance and they are held therein by baffle 20, which moreover might extend only over half of the periphery of the dome; it might be useless on the other half in case of use on an aircraft since the bubbles could go out on that side only during an outside loop.

In order to allow spindle 2 to be easily removed, the diameter of this latter is greater in the lower part than in the upper one, said lower part is threaded and engages a nut 72 fastened on the second cap bottom 13. It is thus easy to adjust very accurately the height of the spindle and consequently that of the rhumb carrier; when the spindle is exactly adjusted it is locked in its place by lock nut 73.

The upper part of spindle 2 is threaded and receives a cap 74 supporting the jewelled step bearing.

If it becomes necessary to remove the spindle, the threaded plug 75 is removed from the corrugated cap bottom 11 and then access to lock nut 73 and to the base of spindle 2 is easy.

It is explained further that it is very desirable to bring the center of gravity of the whole comprising the float, the magnets and the rhumb, in exact coincidency with the point of suspension thereof, in order to satisfy to said condition, said whole is constituted by means of pieces, secured to one another and then shrunk or pressed against each other in such a way that a perfect symmetry with reference to the axis may be obtained, so that members such as rivets or bolts may be avoided, since said members would project and would, by friction with the liquid, lessen the independence of the motions between card and liquid.

This form of construction without soldering allows making the float and rhumb of aluminium, thus making them very light, and consequently increasing the effective directing force of the magnets.

As said above, magnets 6 are inside the float and symmetrically disposed with reference to the axis.

If ordinary rectilinear magnet bars were to be employed, it may be seen on Fig. 4 that such magnets would have their like poles too far from one another for accurate compensation. For avoiding said drawback, and according to the invention, the magnets are curved and shaped substantially as represented; it is thus possible to dispose the poles thereof at the best distance from one another.

On the other hand, it is necessary that the rhumb be readable from the side as well as from the top. This result is obtained by shaping the rim of the rhumb as a frusto-cone the generating lines of which make with the axis an angle of substantially 45°. Thus the graduations engraved on said rim may be read when looking at the rhumb in any direction from vertical to horizontal. The lubber line could be represented by a line drawn on the glass bell, but a preferred device to be disclosed consists in producing on the rhumb itself the virtual image of a steady illuminated line disposed outside the compass.

Figure 5:
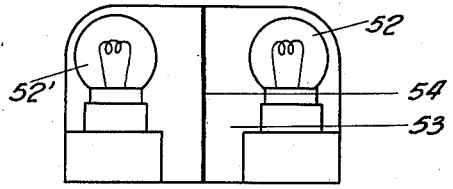
Figs. 5 and 6 show the lamps for production of the virtual pointer, and its cap.
Figure 6:
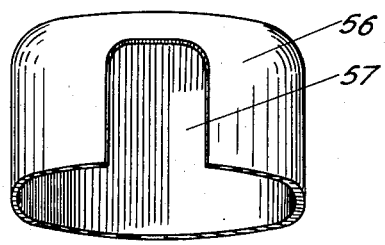

The device comprises (Figs. 1, 5 and 6) a lamp 51 disposed slightly above the bell, in said lamp are two electric bulbs 52 and 52' disposed before an opaque background 53 on which is drawn a black line 54. When the ground is illuminated, the image of black line 54 is seen by reflection on the external surface of the bell; said virtual image is in the position indicated by dotted line 55 in Fig. 1, and cuts the divided rim of the rhumb when this latter is steady. Things are disposed in such a way that, whatever the angle of tilt of the rhumb caused by the motion of the vehicle (aeroplane or ship) the graduated part of the rhumb remain always close to line 55 in order to avoid parallax errors. Lamp 51 may be covered by a cap 56, illustrated in perspective in Figure 6; said cap is provided with an opening 57 on one of its faces; during the day the cap is placed with the opening in front so that the daylight illuminates ground 53 enough to produce a clear virtual image. During the night, lamps 52 and 52' are lighted and, in order that the light thereof does not disturb the pilot, the cap is put on the lantern in the reverse direction, i. e., the opening being behind the background 53; the light rays diffused by back ground 53 and passing by the hollow bottom of the lantern are intense enough to produce a clear image 55 of line 54. Of course things are disposed in such a way that said line indicates the lubber line of the aeroplane. It is possible, without widening the scope of the invention to modify the disposition of said lamp, by instance it might be closed on its foreface by a grid glass on which might be drawn the guiding line giving line 55 as virtual image.

By such a disposition are avoided the parallax errors which would result from a line drawn directly on the bell; and the necessity of a material pointer inside the bell is also dispensed with; such a pointer would, when the aeroplane turns, produce eddy motions in the liquid.

In order to avoid the drawbacks caused by vibrations, according to the invention, the whole formed by the rhumb, float and magnet is so disposed that its center of gravity is on the axis of the float at the apex of the pin.

Generally, in compasses, said center of gravity is a little offset from the axis so that the torque due to gravity balances that due to the vertical component of the terrestrial magnetic field, and the rhumb remains horizontal.

Figure 7:
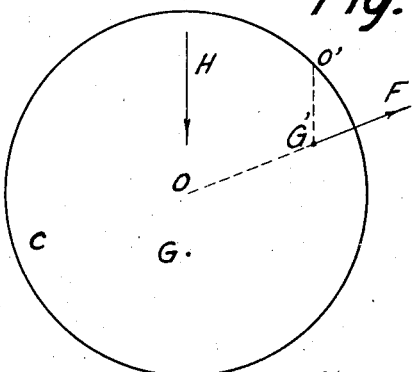
Fig. 7 is a diagram explaining the effect of the vibrations.

Said form of execution presents a series drawback when the apparatus is exposed to vibrations. In order to examine what may happen in such a case with an ordinary compass, it will be assumed by way of example, that the vibrations cause the point of suspension to move on a little circular path; if, as illustrated in Fig. 7, 0 is the rest position of the point of suspension, H the horizontal component of the terrestrial magnetic field, and G the rest position of the center of gravity, when the point of suspension accelerates, for example, to a point O', the center of gravity ought to be at G', straight line O' G' remaining parallel to H. If it was so, the direction of the rhumb should remain unchanged, but, as soon as the vibrations are rapid, viz. as soon as point O' moves over the circumference with a sufficiently great angular velocity W, the centrifugal force takes effect and produces on G' a force G' F directed along OG' and the value of which is $M \times OG' \times W^2$, M being the mass of the whole. Said whole is thus exposed to two forces H and G'F, both of constant magnitude; but one of them remains in a fixed direction while the direction of the other G'F varies at every moment. This may result in substantial deviations of the card.

Said drawback is avoided by disposing the whole (magnet, float, rhumb) in such a way that its center of gravity is on the axis at the apex of the pin. In such a case the effect of the vertical component of the terrestrial magnetic field is no longer balanced by the gravity, but the rhumb takes a rest position a little inclined to the horizontal under influence of said component and of the reduction of effective weight due to the buoyancy of the liquid. This latter force is applied to the center of buoyancy of the whole and it is obvious that if the center of gravity which, owing to symmetry, lies on the axis of the float, is above the point of suspension, said force has a tendency to reduce the inclination and under its influence and that of the vertical component of the terrestrial magnetic field, it will take a rest position which will be less inclined as the buoyancy increases and as its point of application is farther from the point of suspension.

The most cumbrous part of a compass is the compensating devices; it is known that their object is to balance the influence on the compass needle of two magnetic fields created by the magnetic masses on board. One of said fields is produced on one hand by the permanent magnets of the airplane and in the other by the induction produced in the magnetic masses of said aeroplane by the vertical component of the terrestrial magnetic field, consequently it is invariably connected with the aeroplane and remains in the same direction with reference thereto, whatever its direction; the deviation of the compass resulting from said field is called semi-circular deviation. In order to compensate said deviation it is possible to employ two similar devices disposed at right angle to one another, one compensating the fore and aft component and the other the transverse component of said field.

The second field which must be compensated comes from the induction produced in the magnetic masses of the airplane by the horizontal component of the terrestrial magnetic field, said resulting field depends of course on the direction given to the airplane or ship and the deviations resulting thereof are called quadrantal deviations.

The semi-circular compensation has been made till now by different devices which consist in placing adjustable magnets near the compass; all these devices have well-known drawbacks, due either to the inaccuracies of the compensation or to their cumbrous size.

According to the invention the semi-circular deviation is compensated by varying the intensities of two fields producing opposite effects on the compass, said variations being obtained by shunting a part of the flux of said fields by means of a movable permeable bar.

Figure 8:
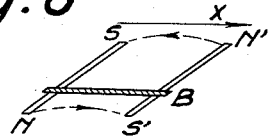
Figs. 8 and 9 are explanatory diagrams of the semi-circular deviation compensating device.

If for instance (Fig. 8) X is the field to be compensated, two magnets NS and N'S' are disposed perpendicularly to X and in opposite directions with one another in order to create between their poles NS' and N'S two fields in opposite directions. According to the position of said magnets with reference to straight line X, the field created thereby on said line is more or less strong and in one direction or in the other. In order to adjust the strength of said field, a soft iron bar is disposed and moved on or near the magnets. It may be seen that, if said bar is at NS' it will absorb almost the whole flux of said poles and the field N'S alone will have an effect $+ Y$ on X; contrarily, by disposing the soft iron bar at N'S the reverse effect is obtained, thus when bar B is displaced along the magnets, the effect on X will vary between the limits $- Y$ to $+ Y$. If the strength of the field to be compensated is comprised between $- Y$ and $+ Y$, it is obvious that an absolutely exact compensation may be obtained.

Figure 9:
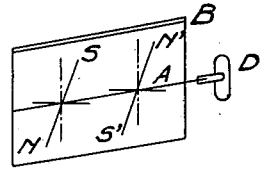
Figure 10:
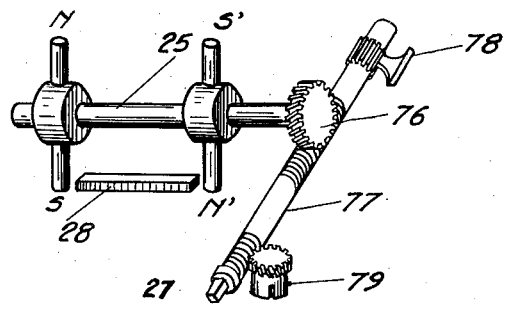
Fig. 10 shows how can be controlled said semi-circular deviation compensating device.

Modifications of the above disclosed device may obviously be employed for obtaining the same effect; for instance (Fig. 9) it is possible to keep bar B steady and to mount magnets NS and N'S' on a spindle A which is rotated by means of a key D. When poles N' and S are close to the bar, poles N and S' alone have an influence and vice versa. As may be seen in Fig. 1, bell 1 is disposed in a casing 18 of bakelite or like substance fixed on the airplane, said casing being provided with a first bottom 19 and a second bottom 21 between which is a chamber 81 designed for receiving the quadrantal compensation devices which will be described. The bell bears on bottom 21 by intermediary of a rubber or like substance packing 22; it is pressed on said packing by a ring 23, made of a material similar to that of the casing, and which bears against a felt washer 24; ring 23 is fastened on the casing by any suitable means. On the lower face of bottom 19 is mounted an apparatus according to the diagram illustrated in Figures 1 and 10. On a spindle 25 rotated in a support 26, are fixed two magnets bars NS and N'S', the spindle 17 is ended by a square cut part 27, on which a key may be engaged. Support 26 bears a soft iron bar 28 which plays the part of bar B in diagrammatic Figures 8 and 9.

If the plan of the figure is assumed to be parallel to the lubber line of the airplane or ship, said device compensates the longitudinal component of the semi-circular deviation.

It should be noted moreover that its effect is all the more strong since the neutralized poles lie farthest from the compass magnets. The field effective at the compass set up by poles NS' and N'S is thus the result of:

1. Different distances between said pairs of poles and the compass magnets,
2. Stronger influence of the soft iron bar on one pair than on the other.

A second similar device at right angle with the former, viz spindle 25' being perpendicular to spindle 25, is used for compensating the transverse component of the field causing semi-circular deviation.

The set formed by both apparatuses is covered by a removable casing 29 fastened on bottom 19.

The device illustrated on Fig. 1 is only a diagram, and has been presented only to explain the working thereof. It is necessary to be able to adjust with the greatest accuracy the position of the magnets, and therefore the device shown by way of example in Fig. 10 may be employed. At the end of spindle 25 on which are fastened the magnets is disposed a worm wheel 76 in engagement with a threaded part of a spindle 77 which may itself be driven by a key; at the opposite end of spindle 77 is a ratchet 78 which fixes the spindle in determined positions. Another threaded part of spindle 77 engages a little drum 79 on which is drawn a sign indicating the initial positions of the magnets.

Several processes are known for compensating the quadrantal deviation, consisting in displacing soft iron masses in the neighbourhood of the magnets; said displacement may be vertical, it then gives a good compensation but the device is too cumbersome for an airplane or a small boat; the displacement may also be made in an horizontal plan; the device is less cumbrous than the former one, but on the other hand it presents the following drawback: when the quadrantal field is weak or even zero in the case of a small airplane or boat, the iron masses, the permeability of which is very great with reference to the neighbouring space, absorb the greatest part of the flux produced by the terrestrial magnetic field, consequently the directing force acting on the compass is greatly reduced.

The quadrantal compensation device according to the invention is light, can be easily removed or put in place, and is entirely enclosed in the flat chamber 81 existing between the two bottoms 19 and 21 of the casing.

Figure 11:
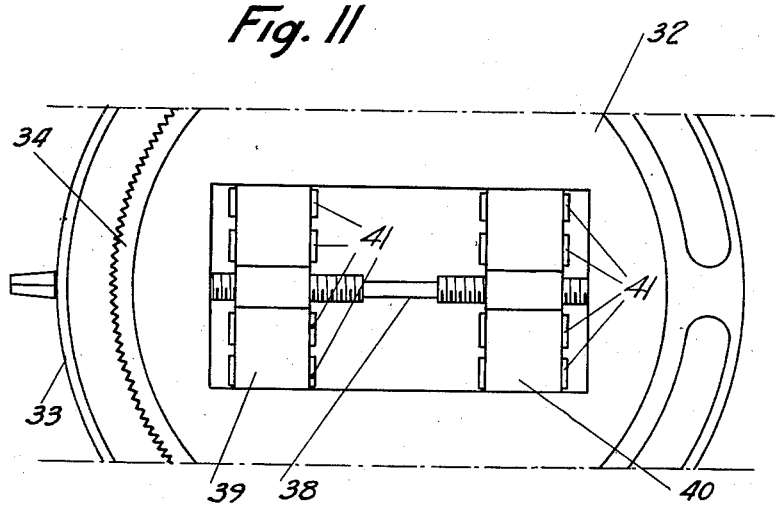
Figs. 11 and 12 are plan views, seen from above and from below, of the plate carrying the soft iron bars for compensating the quadrantal deviation.
Figure 12:
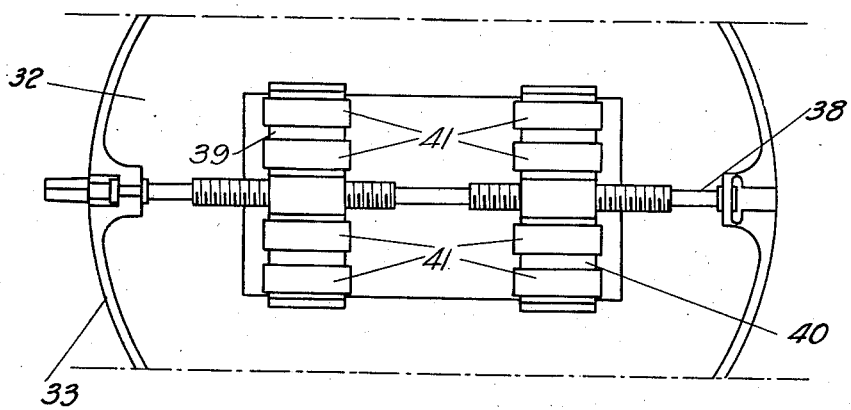

Said chamber is shaped as a cylinder, but on one half of its periphery the cylindrical wall has been removed and this allows putting in place or removing easily a plate supporting the compensating soft iron pieces. Said plate 32 (Figs. 11 and 12) is limited by a rim 33 projecting outwardly on both faces and by intermediary of which it bears on bottom 19; on its lower face represented in Figure 11 it is provided with an externally toothed ring 34 engaging, when the plate is in its place, a pinion 35. Said pinion is fastened on a spindle passing through bottom 19 and ending in a knob 36; when the plate is in its place it can be given a rotation round the compass axis by rotating knob 36 but on the other hand if the knob is pulled downwards, it is possible to move pinion 35 into a recess 37 provided in bottom 19; it is then easy to take out plate 32 by the open part of chamber 81. On the other hand, when the plate is in the chamber, its rim 33 bearing on the wall of said chamber, it is kept in place by the pinion and its only possible motion is the above indicated rotation.

On the upper face of the plate (Fig. 12) is disposed a spindle 38 supported by the rim beyond which it projects by its square cut end on which a driving key may be engaged; two parts of said spindle are threaded respectively left hand and right hand. On these threads are engaged two masses acting as nuts, their lower faces bearing on bottom 19 so that the rotation of spindle 38 brings them nearer or farther from each other without rotating them. On these masses are disposed the compensating soft iron bars 41.

It may be seen that said bars may thus be given a double displacement, at first a rotation round the compass axis by means of knob 37, further a translation parallel to bottom 19 when shaft 38 is rotated by means of a key passing through the open part of chamber 81. When the quadrantal deviation is small enough to be neglected, plate 32 may be removed as above indicated, in order to avoid the pernicious decrease of the directing force due to the terrestrial magnetic flux being shunted by the soft iron bars.

If the quadrantal deviation is weak, without being negligible, say if it is not greater than 4°, it can be compensated by adjusting, as above indicated the position of soft iron bars 41.

Figure 13:
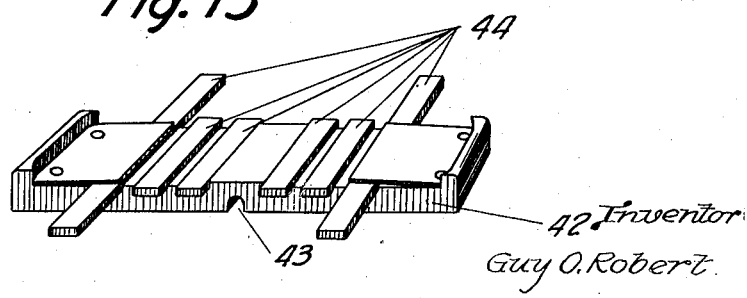
Fig. 13 shows the piece to be added in order to compensate the great quadrantal deviations.

When the quadrantal deviation is greater than 4°, it is possible to compensate it, to 10° for instance, by disposing between masses 39 and 40 a set of fixed soft iron bars, say as illustrated in Figure 13, and comprising a support 42 which is placed on the upper face of plate 32, spindle 32 engaging a slot 43 thereof in order to fix the position; soft iron bars 44 being fastened on said support.

One of the difficulties which arise in the manufacture of airplane compasses is the choice of the material to be used. For ship compasses it is possible to employ bronze or brass, but such apparatuses are very heavy; it is on the other hand impossible to decrease their weight by using everywhere aluminium instead of bronze on brass; said metal is attacked by salt air, and that prevents its use on board hydroplanes; according to the invention bakelite or like substances, are to be widely used, and most of compass members such as casing, cap bottoms, supports plate and so on may be of that substances.

What I claim is:

1. A compass more particularly designed for airplanes, comprising a transparent substantially semi-spherical bell the open part being turned downwards, said bell being filled with liquid of low freezing point, fluidtight means for closing it, a hollow float inside said bell supporting directing magnets and a rhumb, pivotal means for supporting said float, all parts enclosed inside the bell being shaped as surfaces of revolution around the compass axis, means for creating near the rhumb by reflection on the upper part of the bell a virtual image of a pointer line indicating the lubber line of the vehicle carrying the compass, a device under the bell for compensating the quadrantal deviation adapted to be removed from the compass, and another device for compensating the semi-circular deviation under said device.

2. A compass comprising a bell of transparent substance, the external surface of which is constituted by a substantially cylindrical surface and by a segment of a sphere of great radius joined to each other by a tore-shaped surface, a liquid of low freezing point filling said bell, fluidtight means for closing it, inside said bell a float supporting directing magnets and a rhumb, pivotal means for supporting said float, all parts enclosed inside the bell being shaped as surfaces of revolution around the compass axis, means for creating near the rhumb by reflection on the upper part of the bell a virtual image of a pointer line indicating the lubber line of the vehicle carrying the compass, a device under the bell for compensating the quadrantal deviation, means for removably supporting said compensating means on the compass and another device beneath said first device for compensating the semi-circular deviation.

3. A compass comprising a transparent substantially semi-spherical bell, the open part being turned downwards, said bell being filled with a liquid of low freezing point, a corrugated cap bottom closing the bell, said cap presenting an upwardly projecting rim so sized that it applies exactly around the lower part of the bell, a ring of metal having the same coefficient of expansion as the substance of the bell, said ring being disposed around the rim and pressing it against the bell, a float inside said bell supporting directing magnets and a rhumb, pivotal means for supporting said float, all parts enclosed inside the bell being shaped surfaces of revolution around the compass axis, means for creating near the rhumb by reflection on the upper part of the bell, a virtual image of a pointer line indicating the lubber line of the vehicle carrying the compass, a device under the bell for compensating the quadrantal deviation means for removably supporting said compensating means on the compass and another device beneath said first device for compensating the semi-circular deviation.

4. A compass comprising a transparent substantially semi-spherical bell, the open part being turned downwards, said bell being filled with a liquid of low freezing point, a corrugated cap bottom closing said bell, fluidtight means for fastening the bell and the cap bottom, a second dome-shaped cap bottom inside the bell soldered to the corrugated one and provided with holes disposed to allow the air bubbles to pass to the space between the corrugated bottom and the false bottom and baffles disposed for preventing the escape of said bubbles, inside said bell a float supporting directing magnets and a rhumb, pivotal means for supporting said float, all parts enclosed inside the bell being shaped as surfaces of revolution around the compass axis, means for creating near the rhumb by reflection on the upper part of the bell a virtual image of a pointer line indicating the lubber line of the vehicle carrying the compass, a device under the bell for compensating the quadrantal deviation, means for removably supporting said compensating means on the compass and another device beneath said first device for compensating the semi-circular deviation.

5. A compass comprising a transparent substantially semi-spherical bell, the open part being turned downwards, said bell being filled with a liquid of low freezing point, fluidtight means for closing it, an aluminum float inside said bell shaped as a double walled bell, a disc-shaped aluminum rhumb fastened to said float, all the junctions between the different parts of the float and of the rhumb being made by setting and pressing, curved directing magnets disposed inside the float, pivotal means for supporting said float, all parts enclosed inside the bell being shaped as surfaces of revolution around the compass axis, means for creating near the rhumb by reflection on the upper part of the bell a virtual image of a pointer line indicating the lubber line of the vehicle carrying the compass, a device under the bell for compensating the quadrantal deviation, means for removably supporting said compensating means on the compass and another device beneath said first device for compensating the semi-circular deviation.

6. A compass comprising a transparent substantially semi-spherical bell the open part being turned downwards, said bell being filled with a liquid of low freezing point, a fluidtight means for closing it, an aluminum float inside said bell shaped as a double-walled bell, an aluminum disc-shaped rhumb provided with a frusto-conical divided rim fastened on said float, all the junctions between the different parts of the float and the rhumb being made by setting and pressing, curved directing magnets disposed inside the float, pivotal means for supporting said float, all parts enclosed inside the valve being shaped as surfaces of revolution around the compass axis, means for creating near the rhumb by reflection on the upper part of the bell a virtual image of a pointer line indicating the lubber line of the vehicle carrying the compass, a device under the bell for compensating the quadrantal deviation, means for removably supporting said compensating means on the compass and another device beneath said first device for compensating the semi-circular deviation.

7. A compass comprising a transparent substantially semi-spherical bell, the open part being turned downwards, said bell being filled with a liquid of low freezing point, fluidtight means for closing it, a float inside said bell supporting directing magnets and a rhumb, pivotal means for supporting said float, the float, rhumb and magnets being so disposed that the center of gravity of the whole coincides with the point of suspension of the float, all parts enclosed inside the bell being shaped as surfaces of revolution around the compass axis, means for creating near the rhumb by reflection on the upper part of the bell a virtual image of the pointer line indicating the lubber line of the vehicle carrying the compass, a device under the bell for compensating the quadrantal deviation, means for removably supporting said compensating means on the compass and another device beneath said first device for compensating the semi-circular deviation.

8. A compass comprising a transparent substantially semi-spherical bell, the open part being turned downwards, said bell being filled with a liquid of low freezing point, a corrugated cap bottom closing said bell, fluidtight means for fastening the bell and the cap bottom, a second dome-shaped cap bottom inside the bell soldered to the corrugated one, in the center of the corrugated bottom, a screw plug in the center of the second cap bottom, a nut, a threaded spindle engaged in said nut, a step bearing on the upper part of the spindle, a float shaped as a double walled bell, a pin fastened to said float and bearing on the step bearing, a rhumb fastened to the float, curved directing magnets disposed inside the float, all parts enclosed inside the bell being shaped as surfaces of revolution around the compass axis, means for creating near the rhumb by reflection on the upper part of the bell a virtual image of a pointer line indicating the lubber line of the vehicle carrying the compass, a device under the bell for compensating the quadrantal deviation, means for removably supporting said compensating means on the compass and another device beneath said first device for compensating the semi-circular deviation.

9. A compass comprising a transparent substantially semi-spherical bell, the open part being turned downwards, said bell being filled with a liquid of low freezing point, fluidtight means for closing it, a float inside said bell supporting directing magnets and a rhumb, pivotal means for supporting said float, all parts enclosed inside the bell being shaped as surfaces of revolution around the compass axis, a plate outside the bell on which is drawn a black line, means for illuminating said plate, means for fastening said plate above the bell in such a position that the virtual image of the black line produced by the reflection of the external upper surface of the bell cuts the rhumb at rest and remains always close to it during the angular displacements of the compass, a device under the bell for compensating the quadrantal deviation, means for removably supporting said compensating means on the compass, and another device beneath said first device for compensating the semi-circular deviation.

10. A compass comprising a transparent substantially semi-spherical bell, the open part being turned downwards, said bell being filled with a liquid of low freezing point, fluidtight means for closing it, a float inside said bell supporting directing magnets and a rhumb, pivotal means for supporting said float, all parts enclosed inside the bell being shaped as surfaces of revolution around the compass axis, a lamp outside the bell comprising a bottom on which is drawn a black line, two electric bulbs disposed for illuminating said bottom, a cap provided with a window and adapted to cover the lamp with the opening either to the front or the rear, means for fastening said lamp to the remainder of the compass in such a position that the virtual image of the black line produced by reflection on the external surface of the bell cuts the rhumb at rest, and remains close to it during the angular displacements of the compass, a device under the bell for compensating the quadrantal deviation, means for removably supporting said compensating means on the compass and another device beneath said first device for compensating the semi-circular deviation.

11. In a compass as claimed in claim 1, a casing supporting the bell, inside said casing, under the bell, a flat cylindrical chamber one half of the wall of which has been removed, a removable circular plate in said chamber provided with teeth about its periphery, a pinion supported by a spindle passing through the bottom of the chamber, said pinion meshing with the teeth and so disposed that it keeps the circular plate in contact with the remaining part of the cylindrical wall of the chamber, means for rotating the pinion, said pinion and shaft being axially displaceable into a recess provided in the bottom of the chamber to permit removal of said plate from said chamber, a device on said plate for compensating the quadrantal deviation, said device consisting of a rotatable spindle disposed along a diameter of the plate and supported thereon, two portions of said spindle being threaded, one left hand and the other right hand, said portions being separated by a smooth portion, two nuts engaged on said threaded parts, respectively, soft iron bars disposed on said nuts, a removable support adapted to rest on the plate and carrying soft iron bars, said support having a slot to fit over and be fixed by the smooth portion of said spindle.

12. In a compass as claimed in claim 1, said device for compensating the semi-circular deviation consisting in two identical devices disposed at right angles to one another, and consisting each in a spindle, means for supporting and means for rotating each spindle, two magnet bars fastened perpendicularly on said spindle, parallel to each other and with reversed poles, a soft iron bar parallel to the spindle and disposed with reference to said spindle on the side opposite to the bell adjacent the ends of the bars when substantially vertical.

GUY OCTAVE ROBERT.